Jan. 5, 1937.  R. B. SIMPKINS  2,067,103
MEANS OR DEVICE FOR INVESTIGATING, CORRECTING,
AND DEVELOPING THE POWER OF HUMAN VISION
Filed Sept. 4, 1934  3 Sheets-Sheet 1
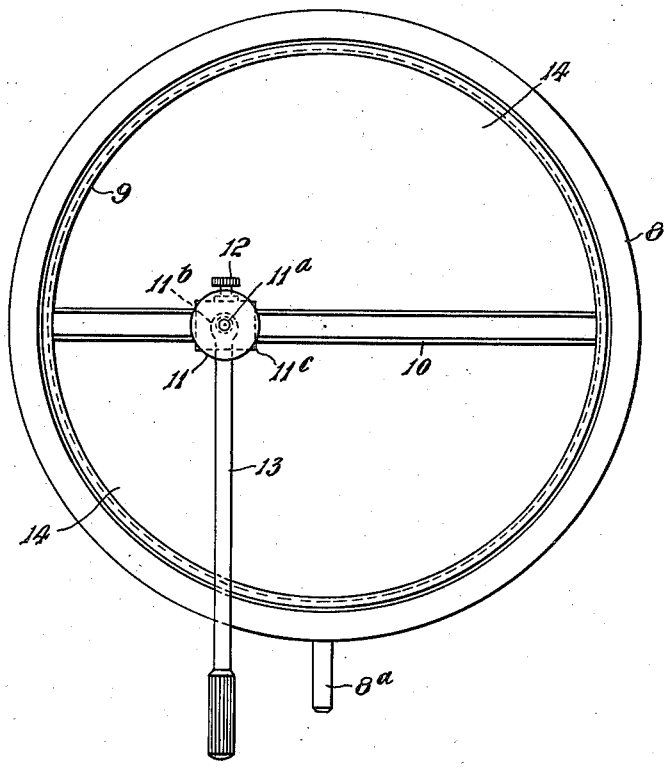
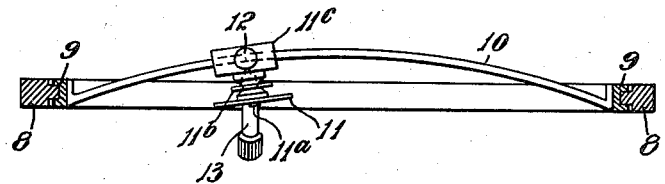
INVENTOR:—
Robert Brooke Simpkins

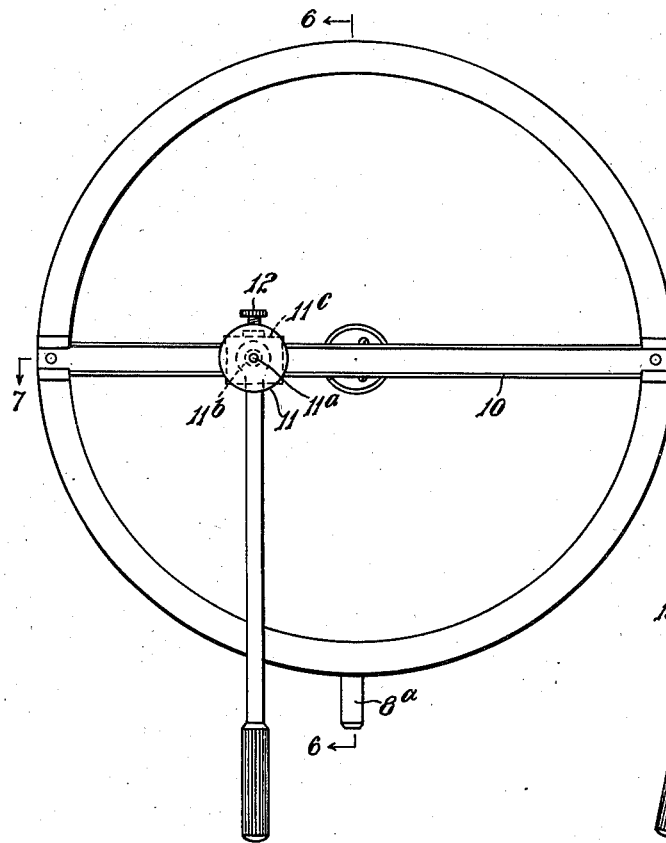
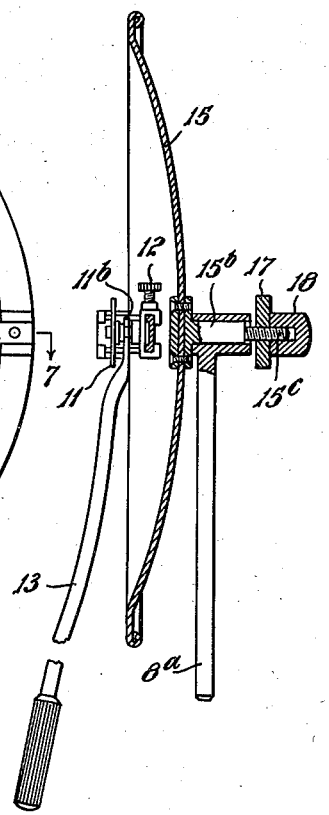
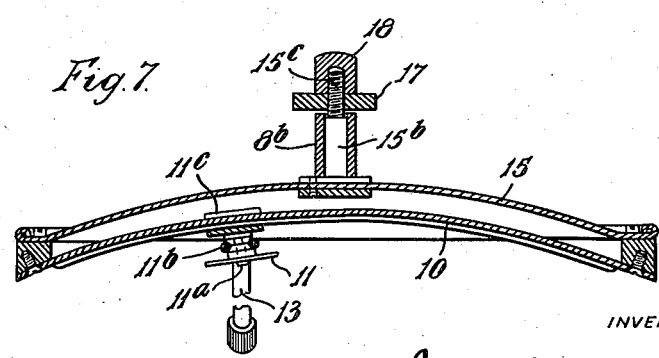

Patented Jan. 5, 1937

2,067,103

UNITED STATES PATENT OFFICE 2,067,103

MEANS OR DEVICE FOR INVESTIGATING, CORRECTING, AND DEVELOPING THE POWER OF HUMAN VISION

Robert Brooks Simpkins, Edgbaston, Birmingham, England

Application September 4, 1934, Serial No. 742,680
In Great Britain September 6, 1933

5 Claims. (Cl. 88—20)

This invention has reference to improvements in or relating to means or devices for investigating, correcting and/or developing the power of human vision.

In the specification of my co-pending application Serial No. 742,678, filed September 4, 1934, I have described a method of investigating, correcting and developing the power of human vision and means or apparatus adapted to be employed in carrying the method into effect said means or apparatus involving a carrier or mount and various devices or appliances adapted for use in conjunction therewith in the ascertainment of abnormalities of vision and the performance of exercises for developing the power of human vision and/or for correcting or remedying defects to which the abnormalities if any are due.

Certain of the appliances referred to in the aforesaid specification are adapted for use independently of the carrier or mount in connection with which their use is therein specifically described and the present invention has reference to an appliance which may be otherwise used than in conjunction with the said carrier or mount.

This invention consists of a means or appliance to be employed for testing and exercising the power of ranging the eye, or eyes, over a spherical surface and comprises a bar curved to the radius of a sphere having the eyeball, or more precisely speaking the optical centre of the eye-ball as a centre, the said bar constituting a track for a slidable focal disc and being mounted diametrically on a ring disposed in an annulus constituting a track for its rotation, or being otherwise mounted for rotation, means being provided for effecting the sliding motion of the focal disc on the curved bar or track and rotation of the said bar or track.

A convenient embodiment of the invention and certain modifications thereof will now be described with reference to the accompanying drawings.

Figure 1 represents in front elevation a device or appliance to be employed for the purposes specified.

Figure 2 is a plan of the same, partly in section.

Figure 3:
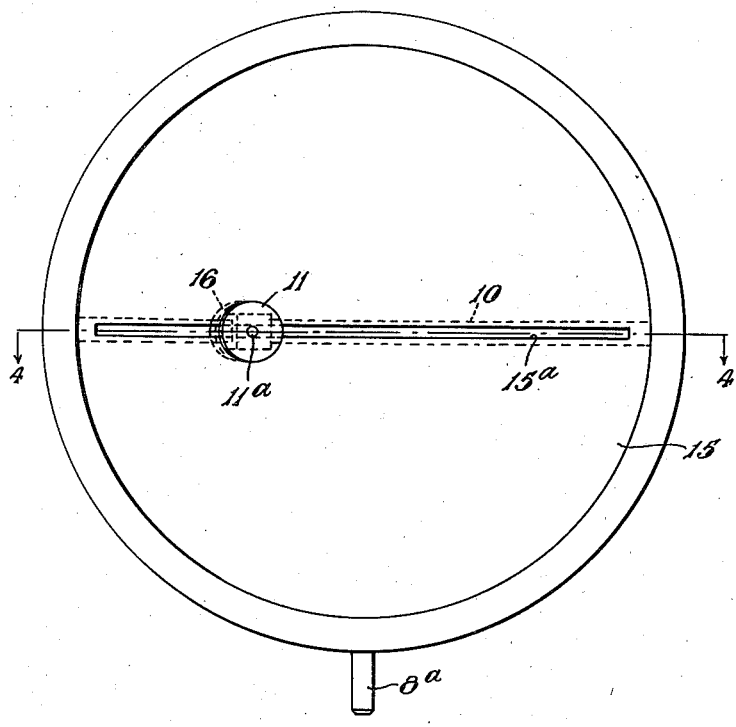
Figures 3 and 4 are similar views to Figures 1 and 2 respectively of a modified construction of the appliance.

Figure 5 represents in front elevation a further modification in the construction of the appliance and Figures 6 and 7 are sectional views taken respectively on the planes indicated by the dotted lines 6—6 and 7—7, Figure 5.

The same numerals of reference indicate the same parts in the several figures of the drawings.

Referring first to the construction represented in Figures 1 and 2, the appliance comprises an annulus 8 which is furnished with a handle or holder whereby it may conveniently be held by the user, or, as shown in the drawings, with a stem such as $8^a$ serving for its attachment to a suitable support, as for example the mount referred to in the specification of my said co-pending application Serial No. 742,678 the inner periphery of the said annulus 8 constituting a track for the rotatable member or ring 9 disposed within its aperture.

The rotatable member or ring 9 is provided with a diametrically disposed bar 10 bent to an arcuate shape the radius of its curvature being conveniently 16 inches, or thereabouts, but this radius of curvature may be varied within very considerable limits depending on the distance at which the appliance when in use is to be held or supported in front of the patient or user.

The said diametrically disposed bar 10 constitutes a rail or track on which is slidably mounted the disc 11 bearing a focal point or spot $11^a$ or other marking. The mounting of the disc 11 on the arcuate track bar 10 may be effected by the provision on the stem $11^b$ of the disc 11 of a channel-like member or carrier $11^c$ adapted to embrace the parallel edges of the bar 10 and slide thereon, a clamping or set screw 12 being furnished in conjunction with the member $11^c$ for fixing the said member and focal disc carried thereby in any position to which it may be adjusted on the bar 10.

To facilitate the adjustment of the disc 11 to the desired position on the diametrical bar or track 10, the stem $11^b$ of the disc is furnished with a depending wire or rod 13 the said wire or rod also serving as a convenient means for effecting the rotation in either direction of the ring or member 9 carrying the diametrical bar 10 whereon the disc 11 is mounted. The attachment of the operating wire or rod 13 to the stem of the disc 11 is such as will permit the said wire or rod to swivel freely on the stem $11^b$.

Figure 4:
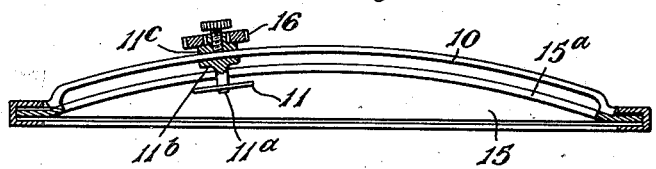

In order to ensure a better concentration of the eye or eyes of the person using the appliance on the focal disc 11 and avoid distraction of the vision by objects which might appear through the segmental gaps 14 on either side of the diametrical bar 10 of the arrangement of Figures 1 and 2, the rotatable ring 9 whereon the said bar 10 is mounted may, as is illustrated in the modified construction represented in Figures 3 and 4 of the drawings, be replaced by a domed disc 15 the said disc filling the aperture in the annular track 8 and being adapted for rotation relative thereto.

The said rotatable domed disc or member 15 has a centre of curvature coincident, or approximately coincident, with that of the diametrical bar 10 which is mounted thereon.

The diametrical arcuate track bar 10 whereon the focal disc 11 is slidably mounted may be arranged on the front face of the disc 15, that is to say, the face which is presented to the user of the appliance, or it may, as is shown in the said Figures 3 and 4, be disposed behind the said domed disc 15 in which case the domed disc is provided with a diametrically extending slot 15ª to permit the stem 11ᵇ of the focal disc 11 which disc is located in front of the domed disc 15 to pass through the domed disc to its slidable connection with the diametrical bar 10 and perform the requisite motions in its diametrical adjustment.

There may be combined with the slidable member or carrier 11ᶜ which in this arrangement has the form of a short tube through which the bar 10 passes, an operating wire or rod similar to the wire or rod 13 of the first described arrangement, or in lieu thereof the member 11ᶜ may have combined therewith a circular disc 16 loosely mounted on a rearward projection provided thereon and constituting a convenient grip for the fingers of the operator when effecting the slidable adjustment of the focal disc, and for rotating the domed disc 11 and parts carried thereby in the use of the appliance for exercising purposes.

Or instead of mounting the rotatable member which carries the curved diametrically disposed bar 10 whereon the focal disc is slidably mounted in an annulus, the said rotatable member may be otherwise mounted in a manner permitting of its rotation.

For example, in the modified construction of mounting illustrated by Figures 5, 6, and 7 of the drawings, the said rotatable member which is constituted by the domed disc 15 is provided on its rear face with a stem or spindle 15ᵇ adapted to fit and rotate in a bearing 8ᵇ provided for its reception at the upper end of the handle or stem 8ª.

In this arrangement the diametrically disposed arcuate bar 10, the curvature of which corresponds with that of the domed disc 15, is located on the front face of the disc, and the focal disc 11, its slidable carrier 11ᶜ and the means combined therewith for facilitating the adjustment of the focal disc on the track bar 10, and for effecting the rotation of the member carrying the said bar 10 are in all respects similar to the corresponding parts in the first described arrangement.

It will be appreciated that the essential feature of this invention is the arcuate bar constituting a track whereon the focal disc may be traversed and by rotation of the track ranged over a spherical field, and although it is preferred to provide a domed disc in conjunction with the arcuate bar or track such domed disc may be dispensed with.

In some of the tests or exercises for which the appliance is designed for use it may be desired to maintain the rotatable member in a fixed position with the diametrical bar 10 which is carried thereby set either in a horizontal or a vertical or in an oblique position and this may be provided for in the last described arrangement by furnishing the stem or spindle 15ᵇ of the disc 15 with a screw threaded portion 15ᶜ adapted to project through the bearing 8ᵇ of the handle or stem 8ª, the said screwed portion having thereon a nut-like disc 17 which when adjusted to take an abutment against the end of the bearing 8ᵇ serves so to clamp the disc 15 to the bearing that it is restrained from rotation. By slacking the disc or nut 17 back from its clamping position free rotation of the domed disc 15 is permitted. The outer end of the spindle 15ᵇ is provided with a boss 18 to limit the extent to which the disc or nut 17 can be slackened.

From the description hereinbefore given it will be appreciated that appliances in accordance with this invention afford means for the binocular or monocular testing and/or exercising of the vision by concentration on a focal spot or object adapted to be traversed at any desired speed on the diametrical bar 10 when set horizontally or vertically or in an oblique direction or while the said spot or object is being revolved at any desired speed and in either direction in paths of variable circumference and hence the exercising of the eyes in both rectilinear and circular movements in all directions is provided for. Furthermore, with the appliance held or supported at a distance of 16 inches from the eyes, or other appropriate distance at which the optical centre of the eye is the centre of curvature of the arcuate bar or track 10, the focus of vision, owing to the curvature of the track bar 10 remains practically constant for all positions of the focal disc thus avoiding strain due to involuntary contraction of muscles for changes in focus, and further the curved plane in which the focussed point travels induces a form of exercise of the eyeballs for maintaining or correcting their globular formation.

What I claim is:—

1. An appliance to be employed in investigating, correcting and/or developing the power or ability of human vision comprising a relatively fixed annulus, a ring rotatable on and disposed within said annulus, a bar carried by and disposed diametrically of said ring, a carrier slidable along said bar, said bar conforming in shape to the surface of a sphere, a stem extending forwardly from said carrier, and a focal member carried by said stem.

2. An appliance to be employed in investigating, correcting and/or developing the power or ability of human vision comprising a relatively fixed annulus, a ring rotatable on and disposed within said annulus, a bar carried by and disposed diametrically of said ring, said bar conforming in shape to the surface of a sphere, a carrier slidable along said bar, a stem extending forwardly from said carrier, a focal member carried by said stem, and an element pivoted on said stem operable to slide said carrier and to rotate said bar and ring.

3. An appliance to be employed in investigating, correcting and/or developing the power or ability of human vision comprising a circular body, means rotatably mounting said body, a mounting element carried by and disposed diametrically within the confines of said body, said element conforming in shape to the surface of a sphere and providing a continuous track from end to end across the axis of rotation of the body, a carrier slidable along said element, a stem extending forwardly from said carrier, a focal member carried by said stem, and an element pivoted on said stem operable to slide said carrier and to rotate said element and body.

4. An appliance to be employed in investigating, correcting and/or developing the power or ability of human vision comprising a body having a spherical surface, a spindle extending rearwardly from the body, a mounting member in which said spindle is journalled, a bar carried by and disposed diametrically of said body in parallelism to said surface, said bar conforming in shape to the surface of a sphere, a carrier slidable along said bar, a stem extending forwardly from said carrier, a focal member carried by said stem, and an element pivoted on said stem operable to slide said carrier and to rotate said bar and ring.

5. An appliance to be employed in investigating, correcting and/or developing the power or ability of human vision comprising a body having a spherical surface, a spindle extending rearwardly from the body, a mounting member in which said spindle is journalled, a screw portion on said spindle, a nut threaded on said portion to bind against said mounting member, an element on said portion to limit the loosening of the nut, a bar carried by and disposed diametrically of said body in parallelism to said surface, said bar conforming in shape to the surface of a sphere, a carrier slidable along said bar, a stem extending forwardly from said carrier, a focal member carried by said stem, and an element pivoted on said stem operable to slide said carrier and to rotate said bar and ring.

ROBERT BROOKS SIMPKINS.